United States Patent Office 3,461,915
Patented Aug. 19, 1969

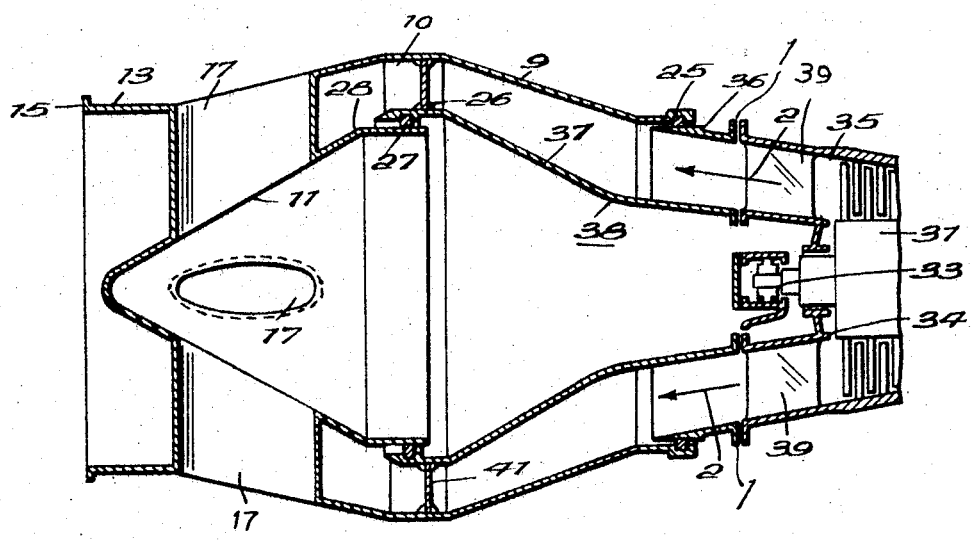

3,461,915
EXPANSION-COMPENSATOR OF THE
NON-LOADED TYPE
Max Hartmann, Baden, Switzerland, Willy Burger, deceased, late of Wettingen, Switzerland, by Jeanne Fanny Burger and Uli Raymond Burger-Straumann, sole heirs, Wettingen, Switzerland, assignors to Aktiengesellschaft, Brown, Boveri & Cie, Baden, Switzerland, a joint-stock company
Filed Oct. 7, 1966, Ser. No. 585,211
Claims priority, application Switzerland, Nov. 29, 1965, 16,384/65
Int. Cl. F16l 55/04
U.S. Cl. 138—31                                                    2 Claims

ABSTRACT OF THE DISCLOSURE

An expansion compensator designed for use in the exhaust pipe of a gas turbine which includes a two part hollow expansible structure within and spaced from a housing which is axially displaceably connected to the exhaust casing of a gas turbine. One part of the hollow structure is connected to the housing and the other part to a cowling surrounding the end bearing of the turbine. The interior of the hollow structure communicates with the atmosphere and thus provides access to the end bearing of the gas turbine contained therein.

The present invention relates to a non-loaded expansion compensator for exhaust pipes from gas turbines having a housing which is sealed in fluid-tight fashion to the exhaust casing of the turbine but is axially displaceable thereon, and wherein there is a hollow member with two end surfaces capable of mutual axial displacement which forms together with the housing an annular flow duct for the gases, one of the said surfaces being rigidly secured to the housing and the other to the exhaust casing.

There is a known expansion-compensator plunger pipe closed at the end and having peripheral holes, and mounted in a fluid-tight housing but displaceable therein by means of a pair of closure collars. The outer space of the housing branches out into individual ducts which come together beyond the ends of the plunger pipe to form a common collector member, the branch ducts being designed on the venturi principle.

This and other known non-loaded expansion-compensators exhibit the disadvantages that the medium has to flow through slits or holes. This hinders the flow, with consequent considerable pressure losses. Since in known expansion compensators the medium is likewise admitted to pressure-compensator surfaces or pistons through narrow slits or holes, undesired delay is imparted to the pressure-compensation when there are sudden changes in pressure such as may occur for example when detonation takes place in air pipes and gas pipes, so that shock-forces acting on the fixed points of the system have to be taken into account.

The object of the present invention is to overcome the said disadvantages. According to the invention, the expansion-compensator is characterized in that both end surfaces are of conical or frusto-conical shape, and in that one end surface may be connected to the exhaust casing of a gas turbine by radiol ribs between which the exhaust gases flow.

The invention is explained by way of example hereinafter with the aid of the accompanying drawing wherein:

FIGURE 1 shows a section in diagrammatic form through an expansion-compensator fitted to the exhaust-gas side of a gas turbine.

The expansion-compensator illustrated in FIGURE 1 is bounded in the axial direction by end flanges 1 and 15. The fluid medium, for example exhaust gases, flow into the expansion-compensator from a gas turbine at the end flange 1, and leave it at the end flange 15; the direction in which the medium flows is indicated by arrows 2.

Flange 1 forms a part of pipe 36, which is connected to the exhauset casing 35 inside which there is a plurality of narrow ribs 39 extending in the direction of the axis of the pressure-compensator. The ribs 39 are secured fast to cowling 34 connected to the end of a conical compensator 37 disposed on the axis of the pipe, so that the end flange 1 is rigidly connected to the compensator surface 37.

Fastened to the end flange 15 on the outlet side there is a short cylindrical piece of pipe 13 which merges into a housing wall 9. A further conical compensator surface 11 is fastened to the inside of the housing wall 9 via ribs 17. The compensator surfaces 37 and 11 are axially expansibly connected to one another, and the connecting element takes the form of a closure collar 27 arranged between the tubular extensions 26 and 28. The two compensator surfaces 37 and 11 can accordingly be displaced axially with respect to one another. Together they form a central hollow member 38 with conical ends 37 and 11. The housing wall 9, whereof one end is connected to the end flange 15, surrounds the hollow member 38 at a definite distance therefrom. The other end of the housing wall 9 is connected via a closure collar 25 to pipe 36 and hence to the end flange 1 on the inlet side. By this construction axial movement between the two end flanges 1 and 15 is possible.

The housing wall 9 forms, together with the external wall of the central hollow member 38, a circular annular flow duct 10 in which the medium flows round the hollow member 38 without having to overcome any appreciable flow resistance.

The ribs 17 carrying the compensator surface 11 are made hollow, being open on the outside of the housing wall 9. This ensures that atmospheric pressure prevails inside the hollow member 38.

The diameters of the closure collars 25 and 27 are at least of substantially the same magnitude. Provided that this is the case, the diameter of the piece of pipe 13 or the aperture in the end flange 15 with respect to the inlet aperture in the end flange 1 may be made of any size without detrimental effect on pressure-compensation. The flow duct 10 may thus be so designed that the flow in it is retarded or accelerated.

It may now be seen from FIGURE 1 that the internal pressure of the medium on the two compensator surfaces 37 and 11 exerts forces which balance those forces tending to force the pipes apart, and that no axial forces are set up by the internal pressure act on the end flanges 1, 15. When the expansion-compensator is arranged in use, the apertures in the end flanges 1 and 15 always lead to corresponding attaching surfaces. In order to gain an idea of the effective forces, it is accordingly expedient to assume that the end flanges 1 and 15 are secured in fluid-tight fashion to flanges which close off the pieces of pipe 36 and 13 and furthermore to assume that the interior of the expansion-compensator, i.e. the flow duct 10, is placed under pressure, while the whole exterior of the expansion compensator is at atmospheric pressure. The assumed fitting of the flanges does not alter the effective forces. Furthermore since the same internal pressure prevails throughout the flow duct 10, only those surfaces on which the internal pressure acts in the axial direction need be considered for the purpose of estimating the effective forces.

It may accordingly be seen that a corresponding effective area of the compensator surface 37 is opposite to the cross-sectional area of the aperture in the end flange 1, and resides in projection of the aperture in the end flange 1 on to the conical compensator surface 37. A corresponding effective area of the conical compensator surface 11 is likewise opposite to the cross-sectional area of the aperture in the end flange 15. The axial forces acting on the end-flange apertures are accordingly eliminated, since in both cases the compensator surfaces 37 and 11 are rigidly secured to the corresponding end flanges 1 and 15, and since atmospheric pressure prevails both inside the hollow member 38 and on the outside of the end flanges 1, 15.

The compensator illustrated in FIGURE 1 includes the closure collar 25 and the closure collar 27. Two tubular extensions 26 and 28 are provided on the two conical compensator surfaces 37 and 11. In this connection, the diameter of the tubular extension 28 is at least substantially equal to that of the piece of pipe 36, and the diameter of the tubular extension 26 is at least substantially equal to that of the tubular extension of the housing wall 9 carrying the closure collar 25. The diameter of the piece of pipe 13 and the aperture in the end flange 15 may then be made of any size having regard to the inlet aperture in the flange 1.

The forces exerted by internal pressure on the end flanges 1 and 15 are held in balance by the opposite forces exerted on the compensator surfaces 37 and 11. The force on the closure collar 25 is compensated for by the force of the internal pressure on a corresponding annular area of the housing wall 9 where the piece of pipe 13 starts, and the force on the closure collar 27 by that of the internal pressure on a corresponding annular area at the end of the conical compensator surface 37. Finally, the forces on the two inclined areas of the housing wall 9 compensate for one another, so that the end flanges 1 and 15 and thus the fixed points connected to them are loaded only by the frictional forces of the closure collars 25 and 27. In addition, there is minimum loss of pressure in the expansion-compensator because the flow duct 10 with the narrow ribs 39 and 17 is designed to favor the flow.

A piece of pipe 36 is flanged on to the casing 35 of the gas turbine 31. The piece of pipe 36 is connected via a closure collar 25 to a housing wall 9, to which an end flange 15 is fastened via a straight piece of pipe 13. If required, the end flange 15 is connected via a fixed extension pipe to a fixed chimney or exhaust-heat boiler for example. The closure collars 25 and 27 enable the housing wall 9 and the turbine exhaust casing 35 to move axially with respect to one another.

A turbine bearing 33 is surrounded by an at least substantially gas-tight cowling 34, which is supported on the turbine casing 35 by, for example, four narrow radial ribs 39 displaced 90° apart. The compensator surface 37 which broadens in the shape of a conical frustum is flanged on to the cowling 34, and is accordingly rigidly secured to the turbine casing 35. A second conical compensator surface 11 is rigidly connected to the housing wall 9 via the ribs 17. The two compensator surfaces 37 and 11 are connected so as to be gas-tight and axially displaceable by the closure collar 27 acting between the tubular extensions 26 and 28.

The housing wall 9, the piece of pipe 36 and the turbine casing 35 on the one hand, and the compensator surfaces 11 and 37 and the cowling 34 on the other hand, form an annular flow duct 10, which leads from the annular gas-turbine duct containing the rotor and guide blades, and opens out into the pipe 13. The interior of the hollow member 38 formed by the compensator surfaces 11, 37 and the cowling 34 is in communication with atmospheric pressure via the hollow ribs 17.

Since the exhaust pipe 13, is generally of large internal diameter, for example three meters, the hollow ribs 17 may also be made relatively large without disturbing the flow in the flow duct 10. It is accordingly possible to reach the end turbine bearing 35, 33 by climbing into a hollow rib 17 and carry out inspection or maintenance work there.

In order to avoid any radial loading on the closure collars 27 and 25, the compensator surface 37 may be suspended from the housing wall 9 by means of diagrammatically illustrated oscillatory elements 41 at its closure-collar end.

The expansion-compensator according to FIGURE 1 is maintained in a non-load condition as follows:

The axial force exerted by internal pressure on the gas-turbine outlet is in balance with a force exerted by internal pressure on a corresponding area of the compensator surface 37 which is rigidly secured to the gas turbine 31. Since the compensator surface 37 is larger in axial elevation than the cross-sectional area of the gas-turbine outlet, an additional force acts on the compensator surface 37. However, this force is held in balance by oppositely directed axial forces on the turbine housing 35, the piece of pipe 36 and the closure collar 25.

The force exerted by internal pressure via the aperture in the flange 15 on a fixing point not illustrated, for example a chimney wall, is opposed by a force exerted by internal pressure on the compensator surface 11 and on the closure collar 25. The forces exerted on the marginal parts of the lateral wall 9 which are inclined with respect to the axis are in turn held in balance.

Provided that the internal diameters of the closure collars 25 and 27 are at least substantially equal, the diameter of the piece of pipe 13 and the aperture in the end flange 15 i.e. the gas-outlet side of the gas turbine 31, may be made as large as may be desired. In the embodiment in FIGURE 1, the aperture in the end flange 15 is greater than the inlet aperture. The flow duct 10 of the expansion-compensator accordingly acts as a diffuser for the gas turbine 31, so that there is no longer any need to provide a separate diffuser.

The non-loaded expansion-compensators described exhibit the great advantage of low flow resistance. As a result, the non-loaded condition is maintained without any appreciable delay even when there are sudden large changes in pressure such as may occur for example when detonation takes place. The expansion-compensators described are simple in construction; and when fitted to the gas-outlet side of a gas turbine, they give access to the inside of the expansion-compensator and thus to the end bearing on the exhaust side of the gas turbine.

What is claimed is:

1. An expansion compensator for use with a gas turbine having an exhaust casing and an end bearing, said compensator comprising a housing sealed in fluid tight manner to the exhaust casing but axially displaceable thereon, a hollow structure located within and spaced radially from the wall of said housing to form an annular passageway therebetween for flow of the exhaust gases through said compensator, opposite end portions of said hollow structure being sealed in fluid tight manner to each other and mutually displaceable in an axial direction, a first set of radial ribs for rigidly connecting one portion of said hollow structure to the housing and a second set of radial ribs for rigidly connecting the other portion of said hollow structure to the exhaust casing, a cowling containing the end bearing of the gas turbine and forming a diffuser with the annularly disposed exhaust casing, said cowling forming an extension of the outer end of said other portion of said hollow structure, the fluid tight seals between the housing and the exhaust casing and the two portions of said hollow structure being substantially the same diameter, at least one of said first set of radial ribs being hollow to permit free communication between the entire interior of the hollow body and the atmosphere, a plurality of oscillatory members for suspending the portion of the hollow structure connected to the exhaust casing from the housing whereby radial loading is avoided at the fluid tight seal between the axiallly displaceable opposite end portions of the hollow structure.

2. An expansion compensator as claimed in claim 1 wherein said at least one hollow rib includes an opening providing access through said hollow structure to the end bearing of the gas turbine.

References Cited

UNITED STATES PATENTS

| 2,406,234 | 8/1946 | Marancik | 285—227 X |
| 2,766,997 | 10/1956 | Hobart | 285—228 |
| 3,369,829 | 2/1968 | Hopkins | 285—227 |

FOREIGN PATENTS 626,704  5/1927  France.

HERBERT F. ROSS, Primary Examiner

U.S. Cl. X.R.

285—228